(12) United States Patent
Robin et al.

(10) Patent No.: US 7,138,979 B2
(45) Date of Patent: Nov. 21, 2006

(54) DEVICE ORIENTATION BASED INPUT SIGNAL GENERATION

(75) Inventors: John F. Robin, Westmont, IL (US); Matt C. Hayek, Libertyville, IL (US)

(73) Assignee: Motorola, Inc., Schaumburg, IL (US)

( * ) Notice: Subject to any disclaimer, the term of this patent is extended or adjusted under 35 U.S.C. 154(b) by 47 days.

(21) Appl. No.: 10/928,235

(22) Filed: Aug. 27, 2004

(65) Prior Publication Data

US 2006/0044268 A1    Mar. 2, 2006

(51) Int. Cl.
*G09G 5/08* (2006.01)
(52) U.S. Cl. ..................................... 345/158
(58) Field of Classification Search ......... 345/156–158
See application file for complete search history.

(56) References Cited

U.S. PATENT DOCUMENTS

| 6,466,198 B1* | 10/2002 | Feinstein | 345/158 |
| 6,765,553 B1* | 7/2004 | Odamura | 345/156 |
| 6,798,429 B1* | 9/2004 | Bradski | 345/156 |
| 6,847,351 B1* | 1/2005 | Noguera | 345/158 |
| 7,002,553 B1* | 2/2006 | Shkolnikov | 345/169 |
| 2003/0043115 A1* | 3/2003 | Silber | 345/158 |
| 2003/0085870 A1* | 5/2003 | Hinckley | 345/156 |
| 2004/0119684 A1* | 6/2004 | Back et al. | 345/156 |
| 2005/0174324 A1* | 8/2005 | Liberty et al. | 345/156 |

\* cited by examiner

*Primary Examiner*—Amr A. Awad
*Assistant Examiner*—Tom Sheng
(74) *Attorney, Agent, or Firm*—Charles W. Bethards

(57) ABSTRACT

A method (500) and apparatus (601) generate an input signal based on the orientation of a device. A sensor (302) such as a camera, a gyro, or an accelerometer detects a change in device orientation and generates a position input signal that is provided to an application program (612) such as a game program, a text messaging program, or a user interface program to affect an operation thereof. The input signal can, for example, affects a navigation position associated with the application program.

17 Claims, 5 Drawing Sheets

DEVICE ORIENTATION BASED INPUT SIGNAL GENERATION

FIELD OF THE INVENTION

The present invention relates in general to input technology for electronic devices, and more specifically to a method and apparatus for generating an input signal to an application program executing on a device such as a wireless communication device based on the orientation of the device.

BACKGROUND OF THE INVENTION

With the widespread proliferation of applications such as games, organizers, user interfaces applications, and the like, for portable electronic devices, wireless communication units, cellular handsets, and the like, and with the incompatibility of standard input devices such as joysticks, mice, or even touch pads with the portable nature of the devices, providing suitable input signals to such applications has become an important factor in product usability and enjoyment.

Portable electronic devices, because of their small size, often suffer limitations in the manner in which the user navigates menus, enters data, or otherwise provides input to applications running thereon. Keypads often have a relatively limited number of keys or buttons, and navigation controls such as joysticks and touchpads if adapted to the small size needed for use with the portable electronic device can be clumsy to use. Many existing portable electronic devices, in addition to number keys and auxiliary keys, have one or more arrow buttons built into the device for providing at least direction selectivity of device features and menu navigation. The small size of the arrow button(s) and the limited directional sensitivity can detract from the overall user experience. Thus the limitation in the availability of small-sized input technology can be an obstacle to convenient, efficient, and enjoyable use of portable electronic devices. Such input technology limitations become more noticeable when text must be entered, complex menus must be navigated, or high speed games are being played.

BRIEF DESCRIPTION OF THE DRAWINGS

The accompanying figures, where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION

Figure 1:
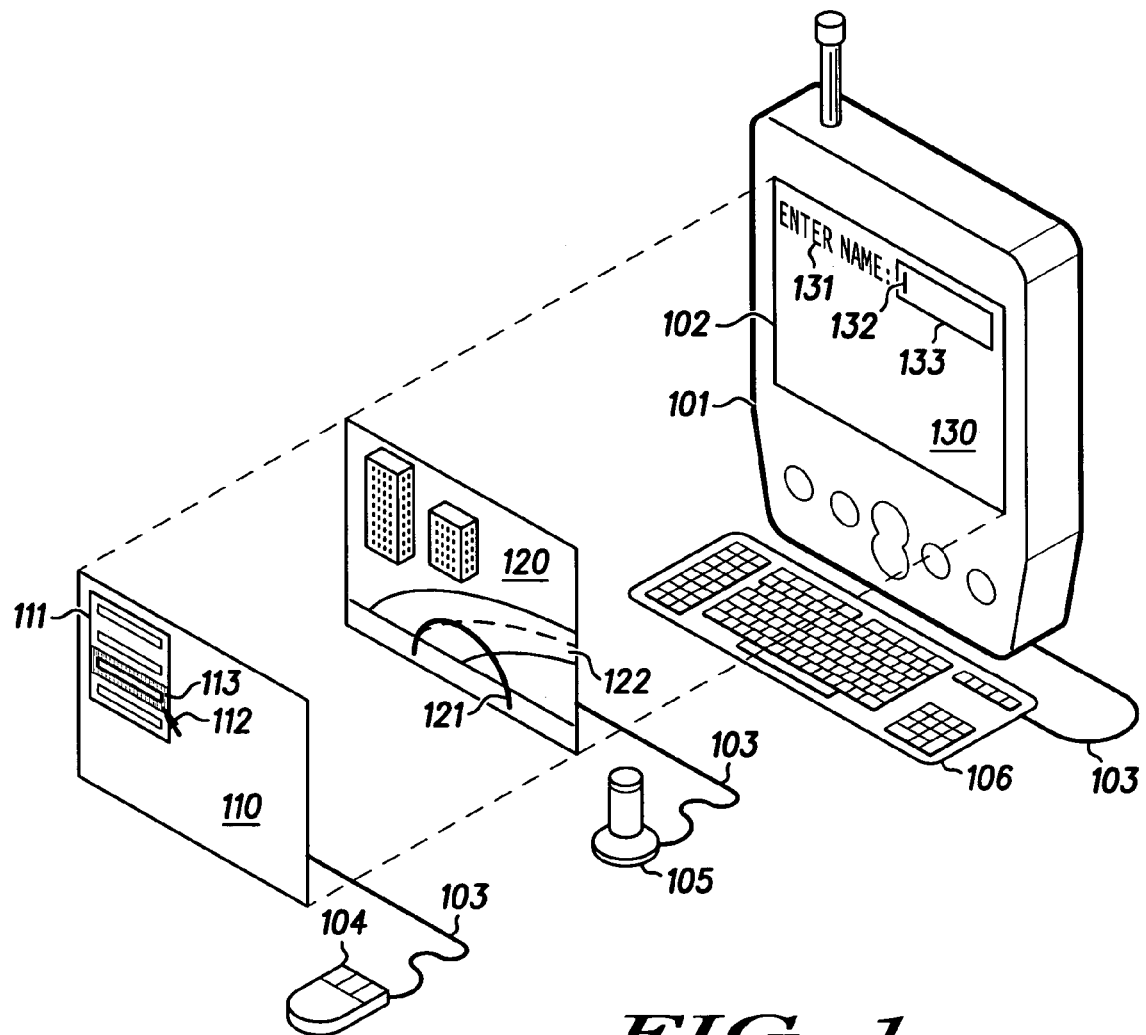
FIG. 1 is a diagram illustrating exemplary application programs and input devices associated with conventional electronic devices and related input technology environments.

In overview, the present invention relates to portable electronic devices such as communications devices or units, often referred to as communication units, such as cellular telephone or two-way radio handsets and the like having the ability to execute application programs requiring input for the purpose of directing or otherwise establishing a navigation position associated with a cursor, blitter, sprite, or other action position related marker associated with the application program. More particularly, various inventive concepts and principles are embodied in communication devices, and methods therein for generating an input signal to an application program based on the orientation of the device itself. It should be noted that in addition to connoting a typical handset, the term portable electronic device or communication unit may be used interchangeably with subscriber unit, wireless subscriber unit, wireless subscriber device or the like. Each of these terms denotes a device ordinarily associated with a user and typically a wireless mobile device that may be used with a public network, for example in accordance with a service agreement, or within a private network such as an enterprise network. Examples of such units include personal digital assistants, personal assignment pads, and other portable personal computers equipped for wireless operation, a cellular handset or device, or equivalents thereof provided such units are arranged and constructed for executing application programs requiring an input signal for menu navigation or the like.

The present description is provided to further explain in an enabling fashion, exemplary modes of performing one or more embodiments of the present invention. The description is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

In addition to devices of a general nature, the communication devices of particular interest are those providing or facilitating voice/data communications services over cellular wide area networks (WANs), such as conventional two way systems and devices, various cellular phone systems including analog and digital cellular, CDMA (code division multiple access) and variants thereof, GSM (Global System for Mobile Communications), GPRS (General Packet Radio System), 2.5 G and 3 G systems such as UMTS (Universal Mobile Telecommunication Service) systems, Internet Protocol (IP) Wireless Wide Area Networks like 802.16, 802.20 or Flarion, integrated digital enhanced networks and variants or evolutions thereof. Furthermore the wireless communication units or devices of interest can have short range wireless communications capability normally referred to as WLAN (Wireless Local Area Network) capabilities, such as IEEE 802.11, Bluetooth, or Hiper-Lan and the like preferably using CDMA, frequency hopping, OFDM (Orthogonal Frequency Division Mulitplex) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication units or devices of interest may be connected to a LAN (Local Area Network) using protocols such as TCP/IP, UDP/UP, IPX/SPX, or Net BIOS via a hardwired interface such as a cable and/or a connector.

As further discussed herein below, various inventive principles and combinations thereof are advantageously employed to provide input signal generation based on device orientation.

Conventional electronic devices executing application programs require input from various sources including, for example, one or more of a keyboard, a mouse, a joystick, or the like. As can be seen in FIG. 1, an exemplary device 101 having a display 102 can run a number of application programs requiring different types of input. For example, an application program 110 is a typical user interface program having a menu 111 with one or more selections such as a selection associated with cursor 112. A user can manipulate the position of a mouse 104 to generate a mouse position signal (not shown) which is transferred to the device 101 via an interface 103, which as will be appreciated by one of ordinary skill can be a serial interface, such as a Universal Serial Bus (USB) interface or any other equivalent electronic coupling interface. The mouse position signal will be used to change the position of the cursor 112 which is placed over a menu item 113 and, through the operation of operating system software, the menu item will be highlighted when the position of the cursor 112 and the menu item coincide. A button on the mouse can be used to "select" the menu item such that the operation corresponding to the menu item 113 is invoked and executed.

In another example shown in FIG. 1, the application program 120 can be a game program such as a battle game, car driving simulator, flight simulator, or the like. It will be appreciated that for certain games, a joystick, a thumbwheel, a steering wheel, or other ergonomically correct input devices may be used to better simulate the experience associated with the game. In an application program 120, a simulated control such as a steering wheel 121 is displayed along with a scene including an action position 122 such as a road surface and in particular, the relation of the simulated automobile with the scene and the road surface. Accordingly, a thumbwheel 105 may be used to generate a thumbwheel position signal (not shown) which is transferred to the device 101 over an interface 103, which as noted above can be a serial interface, such as a USB interface or the like.

The thumbwheel position signal will be used to change the action position in the scene associated with the application program 120 and buttons may be used to perform certain special actions or the like, and when a menu associated with the game is displayed the thumbwheel position signal and the buttons may be used to select menu items in the manner described above.

In addition to application programs requiring coordinate position information such as may be generated by a mouse, thumbwheel, or the like, the application program 130 can be a word processing program, or other text messaging program requiring text input. A prompt 131 can signal to a user that data must be entered in a data entry area 133 where a cursor 132 is positioned. As a user enters information using, for example, a keyboard 106, text appears in the data entry area 133. However, a drawback to use of external input devices such as a mouse, a thumbwheel, or a keyboard is that the devices may not be optimized for use with portable electronic devices.

Figure 2:
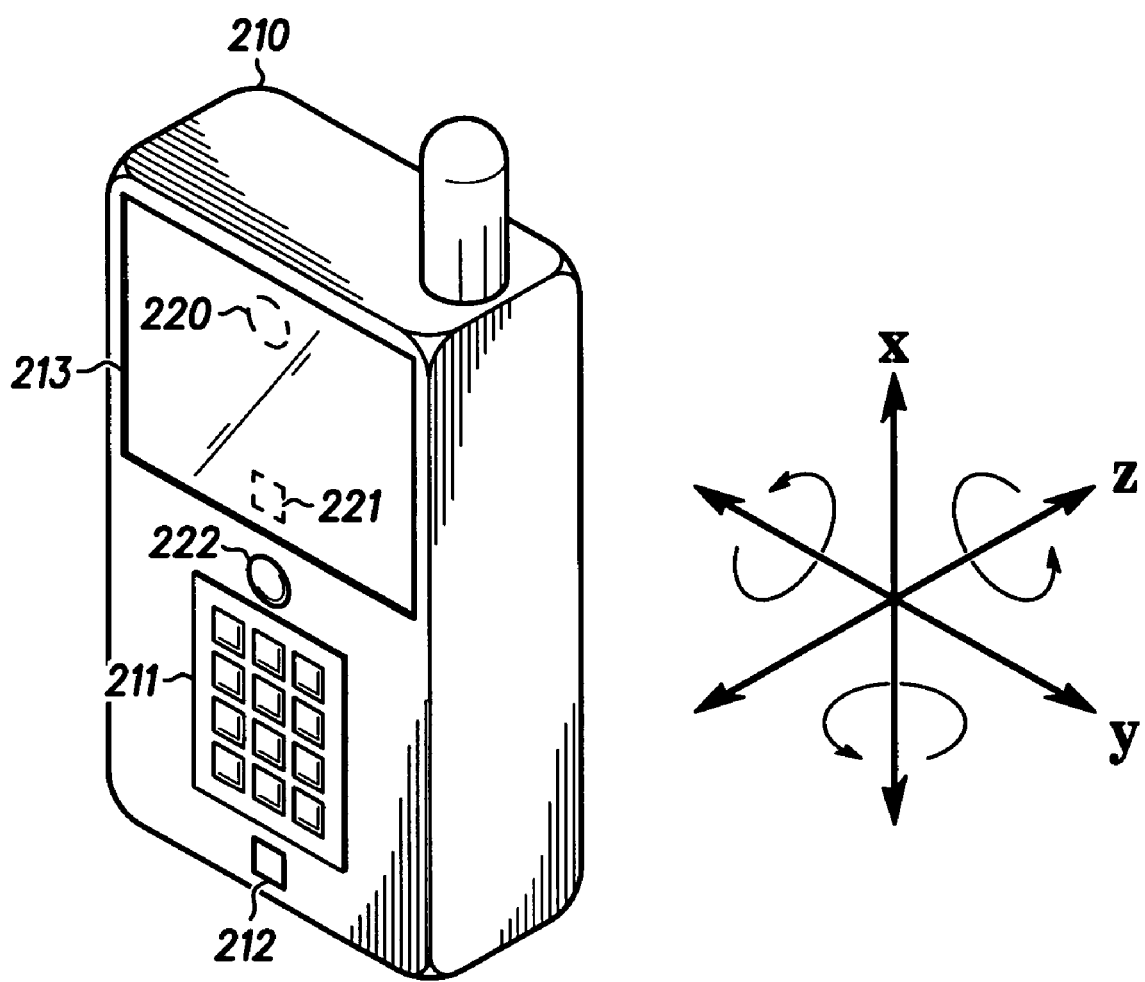
FIG. 2 is a diagram illustrating a simplified and representative exemplary device having orientation sensors in accordance with various exemplary embodiments.
Figure 4:
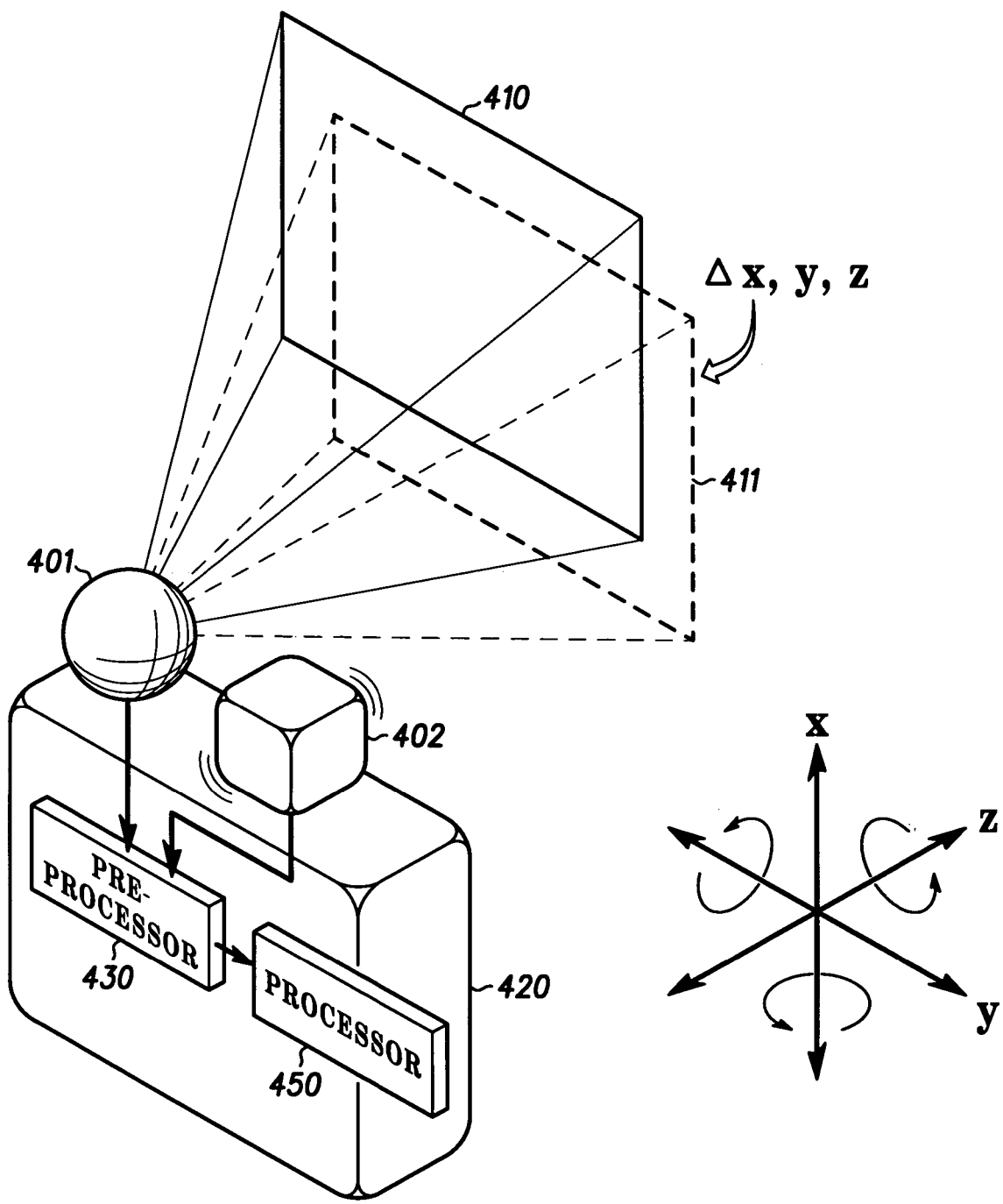
FIG. 4 is a diagram illustrating exemplary detection of changes in orientation for sensors in accordance with various exemplary and alternative exemplary embodiments.

Thus in accordance with various exemplary embodiments as depicted, for example in FIG. 2, device 210 which can be a wireless communication unit or the like as described above, is equipped with a sensor such as a camera 220 located on a back of device 210, an orientation sensor 221 located within the device 210, or a camera 222 located on a front of device 210. It will be appreciated that the orientation sensor 221 can be an accelerometer, a gyro, or any other device capable of sensing a change in an orientation of the device 210 and providing a signal indicative thereof. In accordance with various alternative exemplary embodiments, multiple sensors may also be used such as a camera coupled with an orientation detection device. The device 210 is further equipped with a keyboard 211 and a selector button 212, and a display 213. When the device 210 changes in spatial orientation, such as its orientation or rotation along or about one or more of x, y, and z axes, a signal can be generated proportional thereto such as a raw output signal in the case of the orientation sensor 221 or a delta signal in the case of using the camera 220 or the camera 222 to generate a position signal. It will be appreciated by those of ordinary skill in the art that further signal processing, such as front end processing, as can be performed by a preprocessor or the like, may be necessary to generate an input signal that will be usable by the application programs as described above. Front end processing can be carried out, as will be described in greater detail hereinafter, for example with regard to FIG. 4, to rapidly convert raw sensor signals into values which are usable by an application program.

Figure 3:
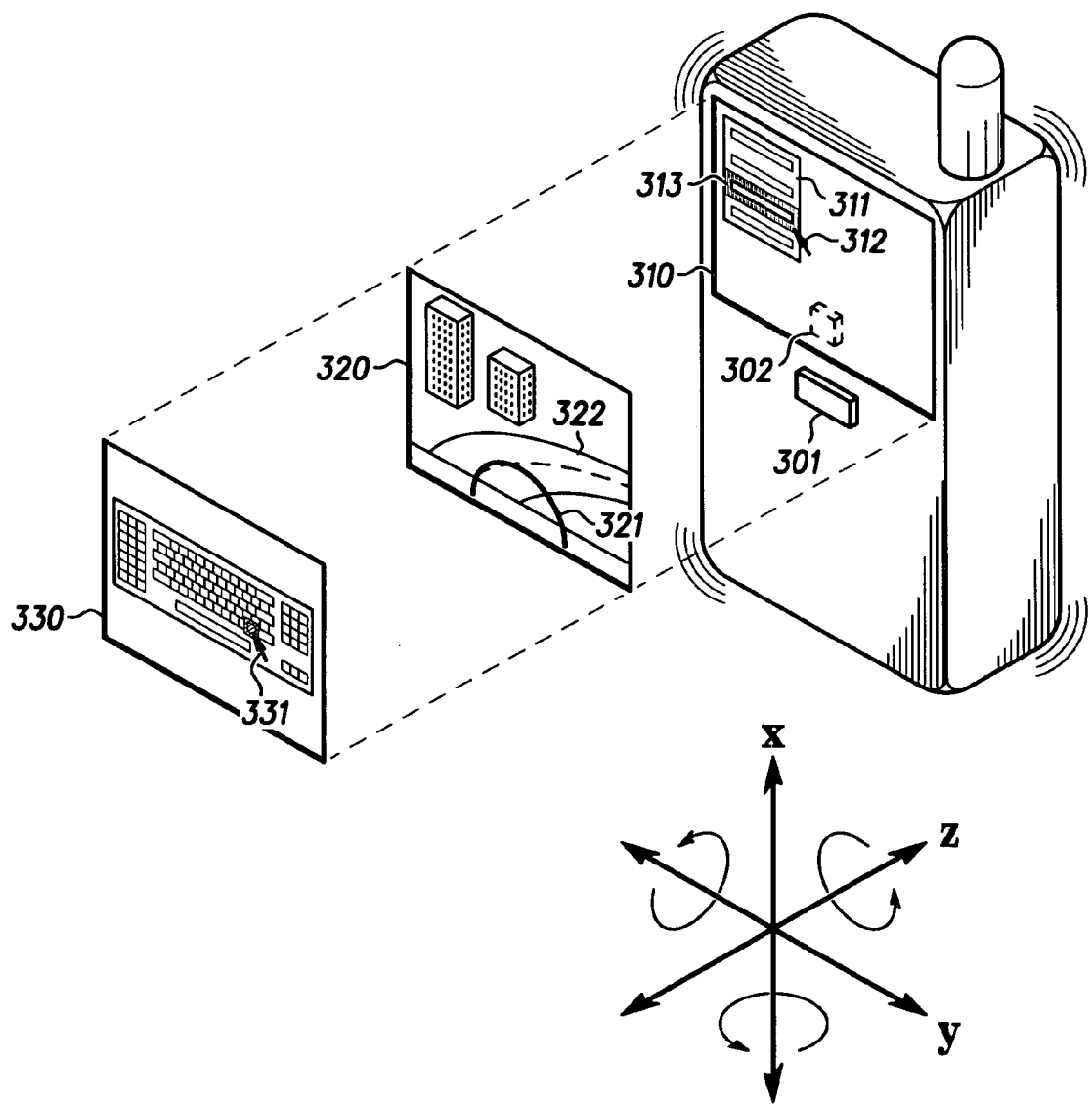
FIG. 3 is a diagram illustrating exemplary application programs using input from sensors generated in accordance with various exemplary embodiments.

Accordingly, as shown in FIG. 3, the applications described above with reference to FIG. 1, can be executed on a portable electronic device and an input signal generated to affect the operation of the application as will now be described. Application 310 uses a sensor 302 which is similar to any one or a combination of, for example back camera 220, sensor 221, or front camera 222, to generate an input signal when the device is moved such as when the device orientation is changed. The input signal can be used to change a position of a cursor 312, such as to place it over a selection item 313 of a menu 311. When the cursor 312 is in a desired position, a select button 301 can be pressed to invoke the operation represented by the selection item 313. An application 320 which can be a game program, such as a vehicle simulator or other game, uses the input signal generated by the sensor 302 to operate a game element such as a steering wheel 321 to control the action position of the game such as the position of the vehicle on a surface of road 322. It will be appreciated that by changing the orientation of the device, the action position of the game can be changed. Additional processing may be required to maintain orientation of the display while processing an input from the sensor 302 and changing the action position. For example, if the user desires to move the action position to the right, the orientation of the device can be rotated to the right. Alternatively, by tilting the device to the right, it may be useful to "tilt" the orientation of the game display in an opposite direction to preserve the actual viewing orientation of the device.

In an application 330, a virtual keyboard may be displayed which can be used in connection with text entry or with a text processing application. When a user changes the orientation of the device, the sensor 302 responds by generating an input signal corresponding thereto. The input signal can be used to change the position of the cursor 331 which can thereafter highlight the present key on the keyboard. By pressing the select key 301, the highlighted key can effectively be pressed and that keystroke will be generated and either input to a text box associated with a data entry application or will be entered into the text processing program. It will be appreciated by one of ordinary skill in the art that variants of the above described applications and use of input signals will be many in number and can include conditioning processing to limit cursor excursions and "calibrate" changes in device orientation to changes in cursor position and the like.

As noted, changes in a sensor output can require further front end processing to convert raw signals generated by sensors or cameras into a usable signal for an application. For example, in FIG. 4, a camera 401 which can be similar to any one of cameras 220 and 222 described hereinabove, can be used to sense a change in the orientation of the device by processing certain parameters associated with a first image 410 and a changed image 411. A delta value or series of delta values can be generated that are associated with the net change in the scene using various image processing techniques as are known in the art. In addition, sensors such as range sensors may be used to improve the quality of the camera generated delta values particularly when addressing "z" coordinates, such as depth or range coordinates which are not as easily generated by image processing alone. Raw image signals may be input to a pre-processor 430 which can be an image processor such as a digital signal processor or the like configured to process differences in scene elements to generate delta values. The delta values may then be input to a processor 450 of a device 420 where they may be fed to an application program or may be processed further before being input to an application program. If an orientation sensor 402 is used, a signal or series of signals can be generated that are proportional to the amount of change in the x, y, and z coordinates. As noted herein, a sensor 402 which can be similar to sensor 221 or sensor 302 described above, can be a gyro, an accelerometer or series of accelerometers configured to output changes in x, y, and z orientation of the device 420. The raw signal output or outputs of the sensor 402 can be fed to the pre-processor 430 which can be a signal processor or a discrete circuit designed to condition the raw signals from sensor 402. It will be appreciated that in many cases the output of the sensor 402 will be an analog signal and thus the pre-processor 440 may require Analog to Digital conversion of the raw signal outputs prior to processing. The pre-processor 430 outputs the conditioned signal to a processor 450 of the device 420 where they may be used by an application.

Figure 5:
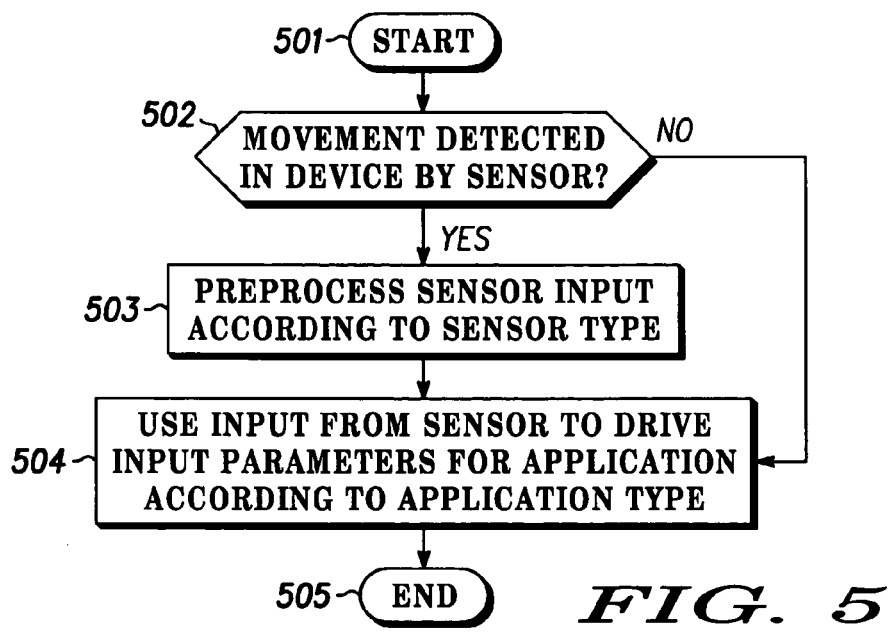
FIG. 5 is a flow chart illustrating an exemplary procedure in accordance with various exemplary embodiments.

A simplified and representative exemplary procedure for operation in accordance with various exemplary embodiments is shown in FIG. 5. The operation, as illustrated, begins at start 501, such as when the device is powered on. Next, movement in the device can be sensed at 502 through interrupt generation or the like as is known to one of ordinary skill in the art. When movement of the device is detected, then preprocessing can be conducted at 503 in accordance with the type of sensor being used. For example, when a camera is used for orientation detection, a change in the scene can generate an interrupt and the new scene information can be preprocessed at 503 to generate an input signal which can be fed to an application program at 504 to drive the application according to what type of application the input is being applied to.

When no movement is detected at 502, then previous input values, such as previous position values can continue to be used by an application program at 504 to drive the application. This situation would correspond to or result in, for example, no change in position of the cursor, action position element or the like. While the procedure can end at 505, it will be appreciated that interrupt detection based on movement of the device will be ongoing and thus the procedure can loop infinitely waiting for movement to be detected whereupon the procedure will repeat at 502.

Figure 6:
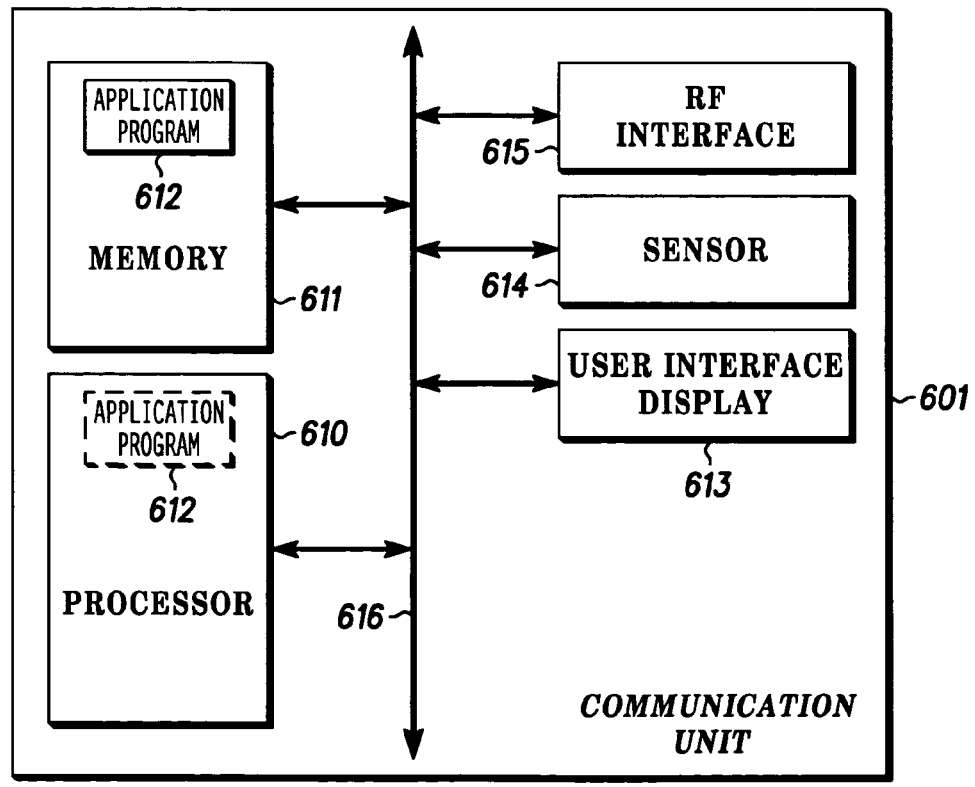
FIG. 6 is a block diagram illustrating components of an exemplary apparatus in accordance with various exemplary and alternative exemplary embodiments.

FIG. 6 is an electronic block diagram of an exemplary apparatus for use in implementation of the present invention. The device 601 of FIG. 6, for example, can be a communication unit or the like as described above, can include a processor 610 and a memory 611 coupled using a bus 616. It will be appreciated by those of ordinary skill in the art that the processor 610 may be a general purpose processor or a dedicated processor such as a signal processor and may be implemented as a dedicated ASIC or the like at noted herein above. The memory 611 can be a memory device such as a Random Access Memory (RAM) which matches the transfer speed and access speed requirements associated with the processor 610 and the bus 616. In addition, the device 601 includes a radio frequency (RF) interface 615, particularly where the device 601 is a communication unit such as a wireless handset or the like.

A sensor 614 can be a sensor or an interface to a sensor, for example, a camera, or a gyro, an accelerometer or the like for generating a raw signal based on a change in orientation of the device 601. In order to display information and receive inputs, such as in the context of the display and application programs as described above, the device 601 also includes a user interface 613 including at least one input device, select button or the like, and a display. An application program 612 is stored in the memory 611 and can be executed in the processor 610 to provide a display associated with the application and to process input such as in accordance with a change in device orientation as discussed and described herein. In accordance with the description above, the sensor 614 can generate raw signals which are preprocessed, that is, for example, filtered, converted from an analog form to a digital form, excursion limited and the like. The processor 610 can control the preprocessing of the signals in a manner known to those of ordinary skill in the art, using, for example, memory 611 to store intermediate values or, alternatively, the sensor 614 can be self-contained and can conduct pre-processing without assistance from the processor 610. In such a situation, sensor 614 can be configured to generate interrupts to the processor 610 at which point pre-processed position values can be made available for reading by the processor 610 while executing an application program. The application program can use the values to re-establish the navigation position of the cursor or other active pointing element.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for providing an input to an application program executing on a device, the method comprising:
   detecting a change in an orientation of the device;
   generating an input signal associated with the change in the orientation;
   providing the input signal to the application program to change an operation performed by the application program, the application program comprising a simulated keyboard program and the providing the input signal facilitating use of the simulated keyboard program, wherein:
   the input signal includes position information,
   the providing includes avoiding position information to change a cursor position associated with the simulated keyboard program,
   the cursor position is associated with a key on the simulated keyboard program; and
   selecting the key when the cursor position coincides with the key.

2. A method in accordance with claim 1, wherein the detecting a change comprises detecting a change using a sensor that includes one or more of a camera, a gyro, and an accelerometer.

3. A method in accordance with claim 1, wherein the application program includes one or more of a game program, a text processing program, and a user interface program.

4. A method in accordance with claim 1, wherein:
   the application program includes a game program, and
   the providing further includes providing position information to change an action position associated with the game program, the action position associated with a user guided action of the game program.

5. A method in accordance with claim 1, wherein the device includes a wireless communication unit.

6. A method for controlling a cursor position associated with an application program executing on a device, the method comprising:
   detecting a change in an orientation of the device relative to a reference position of the device;
   using a sensor comprising one or more of a camera and a gyro to generate a position signal associated with the change in the orientation;
   processing the position signal based on a sensor type associated with the sensor to generate a cursor position signal; and
   updating the cursor position based on the cursor position signal,
   wherein the application program includes a user interface program, and
   wherein the updating the cursor position further comprises updating the cursor position associated with the user interface program, the cursor position corresponding to a selection position associated with a single action of the user interface program, and
   wherein the action associated with the selection position is selected when the cursor position coincides with the selection position and a select signal is generated.

7. A method in accordance with claim 6, wherein the sensor further includes an accelerometer.

8. A method in accordance with claim 7, wherein the device includes a wireless communication unit.

9. A method in accordance with claim 6, wherein the application program includes one or more of a game program and a text processing program.

10. An apparatus for navigating within an application program in a device, the apparatus comprising:
    a memory for storing the application program, the application program further including a program for facilitating text entry and text processing;
    a sensor having an associated sensor type, the sensor adapted to:
    determine an orientation of the device, and
    generate a position signal proportional to a change in the orientation of the device;
    a processor coupled to the memory and the sensor, the processor adapted to:
    execute the application program,
    process the position signal according to the sensor type to generate a navigation position, and
    update a navigation action associated with the application program using the navigation position; and
    a selector coupled to the processor, the selector configured to generate a select signal,
    wherein the application program includes a user interface program,
    wherein the processor in updating the navigation action is further configured to update the navigation action associated with the user interface program, the navigation position corresponding to a selection position associated with a single action of the user interface program, and
    wherein the action associated with the selection position is selected when the position coincides with the selection position and the select signal is generated.

11. An apparatus in accordance with claim 10, wherein the sensor type includes one or more of a camera, a gyro, and an accelerometer.

12. An apparatus in accordance with claim 10, wherein the application program includes a game program.

13. An apparatus in accordance with claim 10, wherein the device includes a wireless communication unit.

14. An apparatus according to claim 10,
    wherein the application program includes a simulated keyboard program, and
    wherein the processor in updating the navigation action is further configured to update the navigation action associated with the simulated keyboard program, the navigation position capable of being associated with a key on the simulated keyboard program, and wherein a key associated with the navigation position is selected when the navigation position coincides with the key and the select signal is generated.

15. An apparatus according to claim 14, wherein the selector includes a select button on the device.

16. An apparatus according to claim 10, wherein the application program includes a game program, and wherein the processor in updating the navigation action is further configured to update the navigation action associated with the game program, the navigation position corresponding to a user guided action position associated with the game program.

17. An apparatus according to claim 10, wherein the action includes a menu selection associated with the user interface program.

* * * * *